United States Patent [19]

Muller et al.

[11] 4,271,227

[45] Jun. 2, 1981

[54] TRANSPARENT FIBROUS SHEETS AND PROCESS FOR MAKING

[75] Inventors: Peter Muller; Henry Mustacchi, both of Port Washington, N.Y.

[73] Assignee: Andrews Paper & Chemical Co., Inc., Port Washington, N.Y.

[21] Appl. No.: 33,801

[22] Filed: Apr. 26, 1979

[51] Int. Cl.[3] ........................ B32B 23/10; B32B 27/10; D21B 3/00

[52] U.S. Cl. ................................ 428/264; 162/168 R; 162/169; 162/182; 428/274; 428/290; 428/513; 428/514; 428/522

[58] Field of Search ............... 428/514, 513, 522, 290, 428/274, 264; 162/169, 168 R, 182

[56] References Cited

U.S. PATENT DOCUMENTS

| | | | |
|---|---|---|---|
| 2,429,060 | 10/1947 | Hoover | 525/27 |
| 3,207,641 | 9/1965 | Small | 428/429 |
| 3,235,443 | 2/1966 | Greeman | 162/168 R |
| 3,410,719 | 11/1968 | Roper | 428/514 |
| 3,778,294 | 12/1973 | Krauch | 428/290 |
| 3,935,364 | 1/1976 | Proksch | 428/513 |
| 4,016,333 | 4/1977 | Gaske | 428/514 |

FOREIGN PATENT DOCUMENTS 932814 7/1963 United Kingdom .

*Primary Examiner*—Ellis P. Robinson

*Attorney, Agent, or Firm*—Kane, Dalsimer, Kane, Sullivan and Kurucz

[57] ABSTRACT

A transparent, non-stratified, three dimensional resin reinforced fibrous sheet and the process for its preparation is disclosed. A fibrous sheet is impregnated or coated with one or more tri or higher functional monomers that can be polymerized in-situ to form three dimensional polymer resins, in close contact with the fibrous material of the sheet. A transparentized fibrous sheet results which is resistant to water and alcohols, highly and evenly translucent and useful as tracing media vellum as well as a translucent base for sensitizing with reprographic coatings.

20 Claims, No Drawings

TRANSPARENT FIBROUS SHEETS AND PROCESS FOR MAKING

BACKGROUND OF THE INVENTION

1. Field of the Invention

The invention relates to methods of transparentizing fibrous sheets such as paper and to the transparentized fibrous products of the method.

2. Brief Description of the Prior Art

Transparent papers and like fibrous sheets are widely used in the packaging, printing and engineering fields. The purposes for using transparentized fibrous sheets such as paper vary from a need for reduced visual and reprint opacity to needs for chemical and physical resistance to degradation under certain conditions of use.

Engineering and reproduction applications of transparentized papers require certain physical and chemical characterstics such as good pencil and ink receptivity for tracing media, and a receptivity combined with frictional resistance which overcomes uneven penetration of coating solutions used in reprographic papers. When these papers are used in drafting, visual brightness is required and high UV translucency is necessary for making good reproductions. In practice, each grade of transparentized paper serves only a particular application. These papers are not interchangeable for each particular application. It is also desirable that a transparentized paper have good physical strength to resist handling, good permanence for record keeping, and chemical stability. Components applied to render the paper transparent should not migrate or volatilize, since that would result in a loss of transparency and contamination of interfield documents.

Paper is a fibrous material composed of a plurality of discrete fibers disposed in a sheet configuration with many voids between the fibers. The disposed fibers scatter incident light. The physical process of rendering paper transparent comprises filling the voids between the fibers with a material that has a refractive index identical or very close to that of the paper fibers. It should be noted that mineral fillers in papers affect the transparency because of their light absorption and light scattering properties and that papers without mineral fillers are preferred for transparentizing use.

Transparentizing paper is a widely established art and has been previously accomplished by impregnating the paper with mineral oils or waxes, polymeric thermoplastic resins such as polystyrenes, polybutenes, polypropenes, various rosin derivatives, and various polymers or copolymes of acrylics and styrene, with or without plasticizers. The application of such materials to the paper is done by either hot melt applications or by applying organic solvent solutions or aqueous emulsions to the paper. The processing equipment used for applying or treating fibrous material such as paper, varies with the type of application employed. For example, the transparentizing mixture may be applied by extrusion, tub, or roller applications and excess material may be removed by a doctoring off process using scrapers, wire, squeeze rollers, or size press. Where paper is employed for transparentizing, it sometimes is "wet packed" after treatment to improve the distrubtion of the transparentizing agents in the body of the paper and then after a certain time the "wet packed" paper is passed through a dryer to remove the solvent vehicle.

Where the transparentized paper is to be employed for drafting use, the transparentizing treatment may be followed by a surface application with resins and toothing agents such as particles of silica.

There are many disadvantages and problems associated with the prior art processes for transparentizing fibrous materials. High molecular weight resins would be desirable for transparentizing fibrous materials because of their physical strength, heat and water resistance, and absence of tendency of the resin to migrate within or out of the finished fibrous material. Such resins, however, can be applied to the fibrous material only with great difficulty since they tend to accumulate near or adjacent the surface of the fibrous material and when impregnation is accomplished the resin is generally unevenly distributed throughout the fibrous material. Thus, the translucency of the product made therefrom is low and is not uniform.

Low molecular weight liquid resins of low viscosity or mineral oils readily penetrate the fibrous material and produce a material of high translucency, but the finished surface would be soft and would not be pencil resistant. The surface would ghost upon erasure. Also, the transparentizing agents tend to migrate from the paper to interfiled documents lying adjacent thereto. Further, such low molecular weight resins or low viscosity materials are volatile and cannot be used where the transparentizing fibrous material is later subjected to elevated temperature processing equipment, such as xerography machines. The surface of such transparentized materials are often tacky to the touch and therefore are undesirable.

Polymeric transparentizing agents which contain polaric and non-polaric groups in the chain are wetting agents and will distribute more readily through the fibrous material. However, such agents form a transparentized fibrous material which is too soft to the touch. Further, such transparentizing agents are mobile and easily leach out in water. They are not set in the fibrous material and would not be suitable for the later application of a diazo-sensitizing solution because such coating would be allowed to deeply penetrate the paper.

The process for transparentizing paper disclosed in U.S. Pat. No. 3,813,261 comprises transparentizing fibrous material by impregnation with a mixture of polyol ethers, a methylol malamine and an acid catalyst to produce an improved translucent material. However, the effective polyol ethers are commercially unavailable due to discontinuation of their industrial manufacture.

Other transparentizing processes comprise polycondensation of polyols with polyisocyanates in situ in the paper. The resulting polyurethane impregnated sheets, however, have insufficient translucency for tracing applications and upon aging product yellow discoloration, even if so called non-yellowing polyisocyanates are used. Further, transparentizing processes with polyurethane forming condensation reactions in-situ generally require the presence of substantial concentrations of non-polaric solvents like xylene to prevent accumulation of residual water in the fibrous material as well as hydroxy groups of cellulosic fiber to interfere with the condensation reaction. The condensation reaction actually takes place in a solution phase and as the polyurethane product resins are still dissolved in the solvent, it is in reality not an "in-situ" process, but the resin sediments out of solution and on to the fibrous material only after evaporation of the solvent at elevated temperature in a separate converting step. It can be well assumed that the polycondensation reaction still continues during the solvent evaporation at elevated temperature. The resin thus is not intimately bound to the fibrous material nor homogeneously distributed to give a low transparentizing effect.

Conventionally, "in-situ" polymerized fibrous materials undergo heat, photo or electron beam polymerization immediately after impregnation in a continuing web pass. In such cases, extreme polymerization conditions are mandatory for economic reasons in order to shorten the reaction time. The polymerization can be considered a spontaneous one. Thus obtained transparentized sheets are more or less stratified materials and have a resin film on the surface which is detrimental to tracing applications, reduces receptivity for diazotype coating solutions, and is a cause for curl problems. If in such applications spontaneous polymerization is avoided through milder conditions, polymerization is incomplete and monomers or dimers remain in the composition. This makes the sheet useless for various applications. Spontaneous polymerization can also result in brittleness of the polymer, causing breaking of the resulting paper sheet, under the pressure of a hard pencil.

It is an objective of the invention to overcome the shortcomings of currently known transparentized fibrous sheets and to provide an improved transparentized fibrous material in sheet form which excels by degree and evenness of translucency, its surface qualities for pencil and ink take and erasure, receptivity of diazotype coatings and its physical endurance. The invention contemplates providing a novel composition for transparentizing fibrous material and the process of making it. We have found that certain tri or higher functional polymerizable monomers, when evenly dispersed within a fibrous sheet, without any excess left on its surface, and when slowly polymerized under controlled temperature conditions with an appropriate catalyst for thermo-polymerization, produce a three dimensional resin reinforced fibrous sheet which excels over currently available material in overall performance and physical endurance.

We have also found that a thorough dispersion of the monomeric material within the fibrous sheet can be best obtained by first applying the monomeric material in conventional manner then winding up the impregnated material in a tight roll, at room temperature, the keeping the thus "wet packed" roll for a certain period of time at a temperature at which no polymerization takes place.

We have further found that a retarded polymerization produces a higher quality transparent sheet than one obtained by spontaneous polymerization and we have found that we can perform such a retarded polymerization by exposing the tightly wound wet packed roll to an elevated temperature for an extended period of time, until polymerization is complete. While the process of the invention is not fully understood, we assume that the polymerization starts from the outside of the impregnated roll (which reaches polymerization temperature first). The heat generated from the exothermic polymerization reaction transmits toward the interior of the roll, thus propagating initiation of polymerization toward the center of the roll. Excessive temperatures which might cause spontaneous polymerization are avoided since a substantial part of the generated heat is absorbed by the fibrous material which is present at a ratio of between 14 and 5 to 1 over the resin forming material in the composition. The resulting transparent sheet has a surface which is matte to the eye and has a toothful feel which is beneficial for tracing purposes as well as for receptivity of diazotype coating preparations. Opacity values as low as 30% (Bausch & Lomb) are easily obtained.

SUMMARY OF THE INVENTION

The invention comprises a transparent, non-stratified, water and alcohol resistant, three dimensional resin reinforced fibrous sheet having as the resin component a thermo polymer of monomers having 3 ethylenically unsaturated radicals bonded to one common carbon atom.

The term "non-stratified" as used herein means that the resin mass is not layered but is composed of polymer molecules which project in multi-directions, i.e.; in three dimensions rather than in an axial direction.

The term "thermo polymer" is used to mean a polymer prepared by heat-activated polymerization of the base monomers.

The invention also comprises a transparentized fibrous sheet, which comprises;

a plurality of discrete fibers which are disposed in a sheet configuration, at least a portion of said fibers being bonded together at cross-over points, forming voids between the fibers at non-crossover points; and a three-dimensional, synthetic polymeric resin evenly dispersed in and filling voids, said resin having been formed in-situ in the voids by thermal polymerization of a monomer selected from those of the formula:

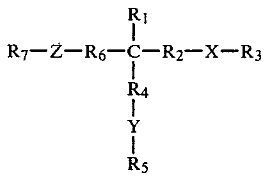

(I)

wherein $R_1$ is selected from the group consisting of hydrogen, alkyl, aralkyl, hydroxyalkyl and carboxyl; $R_2$, $R_4$ and $R_6$ each represent alkylene; $R_3$, $R_5$ and $R_7$ each represent a monovalent moiety selected from those of the formula—$CH{=}CH_2$,

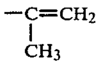

and—$CH{=}CH{-}R_8$ wherein $R_8$ is selected from the group consisting of alkyl and phenyl; and X, Y and Z each represent a divalent moiety of the formula:

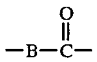

wherein B is selected from oxygen and a group of the formula —NH—.

The invention also comprises the method of transparentizing fibrous sheets, which comprises;

providing a sheet of fibrous material for transparentizing and which comprises a plurality of discrete fibers which are disposed so that at least a portion of said fibers are bonded together at cross-over points, forming voids between the fibers at non-crossover points;

applying to a surface of the sheet a monomer of the formula (I) given above, in admixture with a thermopolymerization catalyst;

evenly distributing the applied mixture of monomer and catalyst so as to fill voids in the sheet with the mixture of monomer and catalyst; and thermally polymerizing the monomer in the voids under controlled conditions under which excessive heat of polymerization dissipates into the fibrous environment and thus inhibits spontaneous polymerization.

The term "alkyl" as used herein means the monovalent moiety obtained upon removal of a hydrogen atom from a saturated aliphatic hydrocarbon. Representative of alkyl are methyl, ethyl, propyl, butyl, pentyl, hexyl, heptyl, octyl, nonyl, decyl, undecyl, dodecyl, tetradecyl, hexadecyl, octadecyl and isomeric forms thereof.

The term "aralkyl" is used to mean the monovalent moiety obtained upon removal of a hydrogen atom from the alkyl portion of an alkyl-substituted aromatic hydrocarbon. Representative of aralkyl are benzyl, phenethyl, phenpropyl, phenbutyl and the like.

The term "hydroxyalkyl" is used throughout the specification and claims to mean alkyl as defined above, wherein a hydrogen atom has been substituted for by a hydroxyl group.

The term "alkylene" is used herein to mean the divalent moiety obtained upon removal of two hydrogen atoms from a saturated aliphatic hydrocarbon. Representative of alkylene are methylene, ethylene, propylene, butylene, pentylene, hexylene, heptylene, octylene, nonylene, undecylene, decylene, tetradecylene, hexadecylene, octadecylene and isomeric forms thereof.

DETAILED DESCRIPTION OF THE PREFERRED EMBODIMENTS OF THE INVENTION

The method of the invention will be described herein as it relates to the transparentizing of paper and more particularly as it relates to papers which comprise a plurality of discrete cellulosic fibers bonded together at cross-over points to make up a sheet of paper. However, it should be appreciated that the method of the invention is not limited to the transparentizing of such representative materials.

The method of the invention for transparentizing fibrous material may be employed on a wide variety of paper based such as paper prepared from rags, chemical pulp or non-woven fibrous material and like materials provided the resulting paper is no contaminated with substances which might inhibit polymerization of the monomers of formula (I) given above.

The paper base provided for transparentizing by the method of the invention may be a non-sized saturating base with or without surface size, or beater sized sheets with or without surface or internal size, as long as the size is permeable to the monomer or its solution in an appropriate solvent. The stronger the base paper is sized, the more attention will have to be given to the step of evenly distributing the monomer (I) in the base paper, as will be described in detail hereinafter. Preferably, the base paper will be free of mineral fillers, since they add to opacity of the paper.

According to the method of the invention, there is applied to a surface of the provided paper base or like fibrous sheet, a monomer of the formula (I) given above, in admixture with a thermopolymerization catalyst.

The thermopolymerization catalyst additive may be used in an effective amount to polymerize the monomers (I). In general, an effective amount is an amount ranging from 0.1 up to about 10 percent, preferably 0.5 percent of the weight of monomer (I). Catalysts include organic peroxides, metal driers, organic and inorganic acids, and the like, and mixtures thereof. Specific examples of catalysts include phosphoric acid; hydrochloric acid; sulfonic acids such as p-toluene sulfonic acid; lactic acid; oxalic acid; maleic, fumaric, phthalic, succinic, and the like acids and anhydrides; oxygen; ozone, peroxides, such as hydrogen peroxide, acetyl peroxide, benzoylperoxide, and lauroyl peroxide; perborates; percarbonates; metal driers, such as the naphthenates, linoleates, resinates, octoates, acetates, borates, oxalates, and the like, of cobalt, manganese, cerium, and lead; amines; amine salts, such as the triethanolamine salt of sulfonic acid and the like; and mixtures thereof. Preferred as the catalyst is a peroxide catalyst such as benzoylperoxide.

The catalyst may be mixed with the monomers of formula (I), employing conventional techniques and mixing apparatus.

Monomer compounds within the scope of the formula (I) are generally well known as are methods of their preparation. For example, preferred compounds of the formula (I) wherein B represents oxygen are monomeric polyesters which may be prepared by the esterification of polyols of the formula:

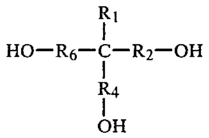

(II)

wherein $R_1$, $R_2$, $R_4$ and $R_6$ are as previously defined; with an acid of the formula:

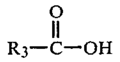

(III)

wherein $R_3$ is as previously defined. Polyols of the formula (II) are well known and are represented by trimethylolpropane, pentaerythritol and the like.

Acids of the formula (III) are also well known and are represented by acrylic acid, methacrylic acid and the like.

Those compounds within the scope of the formula (I) given above, wherein B represents the moiety —NH— are monomeric polyacrylates which may be formed by condensation reaction of a polyamine of the formula (II) given above wherein the hydroxyl groups are replaced with amine groups, with an acid of the formula (III) given above. Polyamines of the described formula are well known as is the method of their manufacture.

The compounds of the formula (I) are free radical polymerizable, polyethylenically unsaturated monomers or oligomers which are generally identified as the acrylic acid esters or methacylic acid esters of aliphatic polyhydric alcohols and mixtures thereof. The molecular structure of the monomer (I) with 3 ethylenically unsaturated radicals linked to one carbon atom leads to 3 dimensional structured resins upon thermopolymerization and seems to be responsible for the physical strength conveyed to the fibrous sheet in the method of the invention. When monomers with one or two ehtylenically unsaturated radicals linked to one carbon atom are used, the transparentized sheets obtained tend to be more brittle.

Higher brittleness of transparentized sheets also develops when resins with chain macromolecules are used with cross linking agents such as formaldehyde derivatives (as is disclosed in various prior art transparentizing processes). The objective of crosslinking is to arrive at solvent and water resistance of the transparent material. With the use of the three dimensional resins in this invention, the resins themselves are insoluble in all common solvents such as alcohols, methylcellosolve, methylethyl ketone, xylene, ethylene dichloride and water and almost insoluble in solvents such as acetone and ethyl acetate.

The mixtures of compounds of the formula (I) and the catalyst may be applied to a surface of the sheet for transparentizing by any convenient and conventional technique employing conventional apparatus. Advantageously, the monomer mixture is applied to the fibrous sheet at a ratio of between 5 and 20 parts of monomer to 100 parts of fibrous sheet, by weight. Depending on the equipment used for the application of the mixture to the fibrous sheet (which can vary from dipping or kiss roller applicators with mechanical scraper bars or squeegee rollers to extrusion coating or other metering devices) the monomer-catalyst mixture may be applied with or without appropriate solvents. The need for a solvent is not functional to the method of this invention, but serves only as a means to control the amount of monomer or monomers (I) applied to the fibrous material and thus is a function of the application equipment and may vary from 0% to 200% based on monomer (I) content. Innocuous volatile solvents, such as isopropanol which do not cause harm to the environment are preferred. The solvent, if any is used, may be removed from the applied to sheet by evaporation, immediately after the application station and prior to the rewinding of the sheet for "wet packing" as will be described hereinafter. If the solvent is not removed prior to wet packing and heat polymerization, no harm is done since the polymerized resin is insoluble in the solvent for the monomers and thus can intimately deposit on to the fiber surface, while it is formed during polymerization, without inhibition by the solvent for the monomer.

Critical to the process of the invention is an even distribution of the applied mixture of monomer (I) and catalyst so as to fill voids in the paper sheet. We have found that this step in the process of the invention is advantageously accomplished by "wet packing" of the paper sheet following application of the monomer-catalyst mixture. Wet-packing is accomplished by winding the web of paper in a roll under tension. Dispersion of the monomer mixture proceeds in the "wet packed" roll with the tight winding of the roll promoting even distribution of the monomer and catalyst, eliminating surface tension effects. The even distribution of the monomer within the fibrous sheet provides for non stratified resin-fiber composition. The wet-packed roll should be allowed to stand at room temperature (or at least at a temperature below the polymerization temperature of the monomer-catalyst mixture, for example at a temperature of between 15°-30° C.) for a period of time sufficient for even distribution of the monomer-catalyst mixture in the voids of the fibrous sheet. It will be appreciated that the length of time will vary depending on a number of factors such as the viscosity of the applied mixture, the nature of the base paper and its sizing, if any, the tension employed in wet packing, etc. Optimum time periods may be determined for given processes by trial and error techniques. In general, we have found that wet-packing for about 24 hours at room temperatures is sufficient to obtain even distribution of the monomer (I)-catalyst mixture in most instances.

Following the even distribution step described above, the monomer (I) may be polymerized in-situ in the fibrous sheet. This is carried out by exposing the sheet to a temperature sufficient to activate the catalyst and initiate polymerization of the monomer of formula (I). For the polymerization step of the preferred process, the "wet packed" roll is placed in a curing oven, preferably at a moderate temperature to generate a low reaction speed rate for the polymerization, resulting in a three dimensional resin reinforced transparent fibrous sheet with optimum qualities. The desirable slow heat polymerization reaction requires only oven space and does not reduce production capacity by a need for more expensive equipment such as radiation curing apparatus. Also, slow polymerization reactions in an oven may be carried out at relatively low temperatures, for example circa 80° C. Instant heat polymerization (as is necessary for polymerizing monomers in a moving web) requires elevated temperatures in the range of 120° C. to 170° C. or more depending on web speed and length of oven. At these elevated temperatures the vapor pressure of the monomers, dimers or other low polymers is high enough to generate formation of smog in the oven environment and exhaust air purification would be mandatory for practical applications. This adds to the cost of a given process. In contrast, the process of the present invention can proceed with polymerization at much lower temperatures, with lower vapor pressure of the monomers. In the tight enclosure of the wound roll of the fibrous sheet, practically no vapors and no smog are released into the environment.

Following polymerization, which is generally complete within 12 to 72 hours, the wound roll may be stored for future use or it may be immediately unwound and converted (cut) to any desired size for use.

It will be appreciated by those skilled in the art that while the production speed of conventional fibrous sheet transparentizing methods (by polymerization or polycondensation in continuous web processing) is limited by the rate of the resin forming reaction and is rather slow unless costly equipment is used, the method of our invention provides a process that can be used with inexpensive equipment consisting of an unwind stand, an application station with or without ensuing dryer to remove part or all volatile solvents (if applicable) and a wind-up stand, without functional processing speed limitations. This is a clear economic advantage.

The following examples and preparations describe the manner and process of making and using the invention and set forth the best mode contemplated by the inventors for carrying out the invention but are not to be construed as limiting. All parts are by weight unless otherwise specified.

EXAMPLE 1

A transparentizer solution is prepared by admixture of the following materials:

trimethylolpropane triacrylate: 160 kg.
Isopropyl alcohol: 160 liters
benzoyl peroxide: 4.1 kg On a paper coating machine running at a speed of 5000 yards per hour, a roll of 6000 yards of a natural, 100% rag paper with a basis weight of 54 g/m$^2$, with internal and surface sizing is roller coated with the above solution. The surplus of transparentizer solution is doctored (with the aid of a doctor knife) from the impregnated base material to leave a surface free of any excess solution. The paper is then passed through the drying tunnel of the machine where a current of warm air at a temperature of 60° C. to 70° C. evaporates the isopropyl alcohol. The paper coming out of the dryer is wet to the touch, but not tacky. It is wound up and kept wet packed for 24 hours at room temperature. Subsequently, the wet packed roll is placed in an oven heated to 85° C. to 90° C. and kept at that temperature for 24 hours. The roll is then rewound for evaluation and sample sheets cut out from the outside, the center and the inside of the roll. All three samples have exactly the same properties and measurements and all three give the same results.

The paper thus obtained increased its basis weight to 61 $g/m^2$. It had an opacity of 30%, measured on a Bausch & Lomb opacimeter. It is highly and evenly translucent to visible and ultra violet light. It exhibits excellent dimensional stability when compared to transparentized papers using different systems, and greater permanency. When dipped in water, acetone, alcohol or toluene, and redried, no change in translucency is apparent. Its hard surface on either side is receptive to tracing pencils of the range from No. 2 through No. 8H (from softest to hardest) and also to different black inks; the lines drawn can easily be erased leaving absolutely no "ghost" image. When used as a tracing for making reprints on a diazotype paper, the printing speed is 80% faster than if the paper had not been transparentized.

The transparentized sheet obtained in this example is used to prepare an intermediate diazotype reproduction paper in the following manner.

The roll of paper is placed on a diazotype coating machine with three air knife coating stations and precoated on the first coating station with a preparation of:

| | |
|---|---|
| water | 1000 parts |
| ammonia | 14 parts |
| colloidal silica | 70 parts |
| 8% antifoam dispersion | 2 parts |
| polyvinyl acetate, 50% dispersion in water | 80 parts |
| wax emulsion | 12 parts |

and dried thereafter and then sensitized in the second coating station with a preparation of:

| | |
|---|---|
| water | 1000 parts |
| tartaric acid | 40 parts |
| 1-diazo 4-N,N diethylamino benzene chloride ½ zinc chloride (Diazo #49, Andrews Paper & Chemical Co., Port Washington, New York) | 40 parts |
| isopropyl alcohol | 10 parts |
| 2,5 dimethyl-4-morpholino methylphenol (Coupler #603, Andrews Paper & Chemical Co., Port Washington, supra) | 40 parts |
| 2-resorcylic acid (Coupler #320, Andrews Paper & Chemical Co., supra) | 10 parts |
| thiourea | 20 parts |
| colloidal silica | 20 parts |
| polyvinylacetate (50% aqueous dispersion) | 50 parts |
| zinc chloride | 25 parts |

and dried thereafter and then backcoated in the third coating station with a preparation of:

| | |
|---|---|
| water | 1000 parts |
| citric acid | 10 parts |
| zinc chloride | 30 parts |
| polyvinylacetate (50% aqueous dispersion) | 40 parts |

and dried to a residual moisture of 3.5%. The thus obtained intermediate diazotype paper is exposed behind an original tracing in a diazotype printing machine and developed with ammonia vapors. A high quality intermediate diazotype, with deep brown print line on a clear evenly translucent background, without objectionable curl and with good line reproducibility is obtained. The reprint speed to produce opaque diazotype copies exceeds by 30% the reprint speed of a prepared diazotype intermediate, which is sensitized with the same diazotype coating solution, but transparentized with a conventional solution of alpha methylstyrene polymer in toluene.

EXAMPLE 2

A transparentizer solution is prepared by mixing the following materials:

| | |
|---|---|
| trimethylolpropane trimethacrylate | 1500 g |
| ethyl alcohol | 2000 cc |
| benzoyl peroxide | 35 g |

On a paper impregnating machine, a calendered 100% rag base paper of 45 $g/m^2$ with internal sizing and surface sizing, travelling at a speed of 4000 yards per hour, is dipped into the above solution and immediately thereafter passed through a pair of squeeze rollers to eliminate any excess solution from the surface. The paper is then processed through the machine in a similar fashion to that of Example 1. The transparentized sheet obtained in this example when used as a tracing for making reprints on an opaque diazotype paper showed a 75% improvement in printing speed over the paper that had not been transparentized. Intermediate diazotype reproduction papers were prepared, using the transparentized sheet in this example through precoating and sensitizing or direct sensitizing as described in U.S. Pat. Nos. 2,516,931; 2,950,852 and 3,330,662. High quality intermediates with dense actinic lines and high reprint translucency are obtained.

EXAMPLE 3

The transparentizer solution of Example 1, supra is applied to a white calendered cotton linters paper of 54 $g/m^2$ basis weight with internal sizing and surface sizing and the paper is processed through the machine in the manner described in Example 2, supra.

The paper obtained was tested as a drafting vellum against the same paper impregnated with conventional transparentizing solutions of (a) alpha methylsytrene polymer or (b) polybutene resin.

The results are shown in the following table:

| | Example 3 | (a) Alphamethyl Styrene Polymer | (b) Polybutene |
|---|---|---|---|
| pencil lead acceptance | excellent | good | good |
| pencil wear | good | good | good |
| pencil erasure: HB (soft) | excellent no ghost | fair slight ghost | poor severe ghost |
| 8H (hard) | excellent no ghost- no craze | good no ghost- some crase | good slight ghost |
| India Ink acceptance | excellent no ink spread | good no ink spread | fair some ink spread |
| India Ink erasure | excellent | fair | poor |

EXAMPLE 4

A transparentizing solution is prepared by mixing the following materials:

| | |
|---|---|
| trimethylolpropane triacrylate | 1000 g |
| trimethylolpropane trimethacrylate | 600 g |
| isopropanol | 1500 cc |
| benzoyl peroxide | 50 g |

On a paper impregnating machine, the above solution is applied to the same base paper and in the same manner as in Example 2, supra.

The paper thus obtained had increased its basis weight by 15% and had an opacity of 30%, measured on a Bausch & Lomb opacimeter.

This paper was used to prepare a lacquered diazotype intermediate material on a solvent diazotype coating machine by applying, in a manner well known in the art, the following solution:

| | |
|---|---|
| isopropanol | 720 parts |
| ethylene glycol monoethyl-ether | 960 parts |
| methylethyl ketone | 720 parts |
| thiourea | 12 parts |
| sulfosalicylic acid | 16 parts |
| 4,6 dichlororesorcinol (Coupler #346, Andrews Paper & Chemical Co., supra) | 45 parts |
| 1-diazo 4,N,N-diethylamino benzene borofluoride (Diazo #69, Andrews Paper & Chemical Co., supra) | 40 parts |
| cellulose acetate butyrate | 250 parts |

and drying to eliminate the solvents. The thus obtained lacquered diazotype intermediate is exposed behind an original tracing in a diazotype printing machine and developed with ammonia vapors. Very dense brown print lines on a clear, evenly translucent background and a high gloss surface are obtained. When compared to a conventional lacquered diazotype intermediate made by applying the same sensitizing solution in an identical way to a wood pulp natural transparent paper (also called "calque"), the material of this example shows the following advantages:

(a) Freedom of curl under varied atmospheric conditions, while the natural tracing paper is sensitive to moisture and curls in humid atmosphere.

(b) Unaffected by water, while the natural tracing paper is severely distorted by contact with water.

(c) Improved shelf life caused by the inertness of the base. The natural tracing paper interacts with the sensitizer to reduce shelf life.

(d) Improved tear and fold strength.

EXAMPLE 5

The procedure of Example 1, supra, is repeated except that pentaerythritol triacrylate is used instead of trimethylolpropane triacrylate. The transparentized paper obtained showed the same properties as that obtained in Example 1, with an opacity of 33 on a Baush & Lomb opacimeter.

The transparentizing step with the same component ratios is once again repeated, but the temperature in the drying tunnel of the coating machine is increased to 175° C. to observe the effect. Spontaneous polymerization is obtained. Under such conditions, profuse monomer fumes evolved during the drying as the polymerization reaction seemed to enter into competition with the volatility of the monomer at high temperatures. The resultant transparentized paper showed a much higher opacity of only 55 and a lower weight gain.

EXAMPLE 6

A transparentizing composition is prepared by dissolving 2.5 parts of benzoyl peroxide in 100 parts of trimethylolpropane triacrylate.

On a paper impregnating machine, a mill roll of 50 $g/m^2$ bleached sulfite base paper with internal sizing and surface sizing, travelling at a speed of 2000 yards per hour, is dipped into the above solution. The surplus of transparentizer solution is doctored with the aid of two doctor knives, one on each side of the paper, to leave a surface free of any excess solution. The paper is then transported through the machine at room temperature and immediately thereafter wound up. It is kept wet packed for 48 hours then placed in an oven heated to 95° C. and kept at this temperature for 36 hours. The paper thus obtained exhibited a high and even translucency. It was used to prepare an intermediate diazotype reproduction paper in the following manner.

The roll of paper is placed on a diazotype coating machine with two air knife coating stations and coated on the first coating station with a preparation of:

| | |
|---|---|
| water | 1000 parts |
| citric acid | 40 parts |
| sulfosalicylic acid | 20 parts |
| 1-diazo-3-methyl-4-pyrrolidino benzene chloride, ½ zinc chloride (Diazo #88, Andrews Paper & Chemical Co., Port Washington, N.Y.) | 30 parts |
| 1-diazo-4-N,N dimethylamino benzene chloride, ½ zinc chloride (Diazo #48, Andrews Paper & Chemical Co., supra) | 30 parts |
| thiourea | 15 parts |
| dipropylene glycol | 50 parts |
| 1,10-dicyanoacet-triethylene tetramine HC 1 salt (Coupler #690, Andrews Paper & Chemical Co., supra) | 50 parts |
| 2,3 dihydroxy naphthlene-6-sulfonic acid sodium salt (Coupler #111, Andrews Paper & Chemical Co., supra) | 10 parts |
| aluminum sulfate | 5 parts |
| isopropyl alcohol | 100 parts |
| zinc chloride | 100 parts |
| rice starch | 100 parts |

-continued

| | |
|---|---|
| polyvinyl acetate (50% aqueous dispersion) | 100 parts |

and dried thereafter and then backcoated in the second coating station with a preparation of:

| | |
|---|---|
| water | 1000 parts |
| citric acid | 10 parts |
| zinc chloride | 50 parts |

and dried to a residual moisture of 3.5%. The thus obtained intermediate diazotype paper is exposed behind an original tracing in a diazotype printing machine and developed with ammonia vapors. A highly translucent intermediate diazotype with black print lines on a clear background is obtained. The reprint speed to produce opaque diazotype copies is 25% higher than the reprint speed of the same base paper, transparentized with a polybutene solution and sensitized with the same diazotype preparation in the same manner.

What is claimed is:

1. The method of transparentizing fibrous cellulosic sheets, which comprises:

providing a sheet of fibrous cellulosic material for transparentizing and which comprises a plurality of discrete cellulosic fibers which are disposed so that at least a portion of said fibers are bonded together at cross-over points, forming voids between the fibers at non-crossover points;

applying to a surface of the sheet a monomer of the formula:

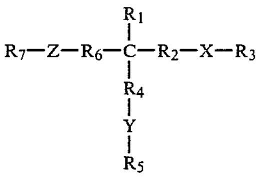

wherein $R_1$ is selected from the group consisting of hydrogen, alkyl, aralkyl, hydroxyalkyl and carboxyl; $R_2$, $R_4$ and $R_6$ each represent alkylene; $R_3$, $R_5$ and $R_7$ each represent a monovalent moiety selected from those of the formula:

$—CH{=}CH_2$,

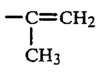

and $—CH{=}CH—R_8$ wherein $R_8$ is selected from the group consisting of alkyl and phenyl; and X, Y and Z each represent a divalent moiety of the formula:

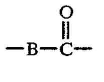

wherein B is selected from oxygen and a group of the formula —NH—;

in admixture with a thermoploymerization catalyst;

evenly distributing the applied mixture of monomer and catalyst so as to fill voids in the sheet with the mixture of monomer and catalyst by wet-packing the applied to sheet in a roll under tension for a period of time sufficient to achieve said distributing; and thermally polymerizing the monomer in the voids by heating the wet-packed roll to a temperature sufficient to activate the catalyst and dissipating excessive heat of polymerization into the environment of fibrous material to prevent spontaneous polymerization from overheating.

2. The method of claim 1 wherein said sheet is a rag paper.

3. The method of claim 1 wherein said sheet is a paper made from chemically purified wood pulp.

4. The method of claim 1 wherein said sheet is a paper with internal and surface sizing.

5. The method of claim 1 wherein the monomer is selected from the group consisting of trimethylolpropane triacrylate, trimethylolpropane trimethacrylate, pentaerythritol triacrylate, pentaerythritol trimethacrylate and mixtures thereof.

6. The method of claim 1 wherein the catalyst is peroxide.

7. The method of claim 6 wherein the catalyst is benzoyl peroxide.

8. The method of claim 1 wherein the proportion of catalyst is up to about 10 percent by weight of monomer.

9. The method of claim 8 wherein the percentage is between 0.5 and 5 percent.

10. The method of claim 1 wherein the monomer mixture is applied to the fibrous sheet at the ratio of between 5 and 20 parts of monomer to 100 parts of fibrous sheet, by weight.

11. The method of claim 1 wherein the monomer is diluted with a volatile solvent.

12. The method of claim 11 wherein the solvent is isopropyl alcohol.

13. The method of claim 11 wherein the solvent is subsequently removed by convection air dryer.

14. The method of claim 1 wherein the monomer application to the fibrous sheet is made by initial dipping and subsequent excess removal by squeeze rollers.

15. The method of claim 1 wherein the temperature is 80° C. and said temperature is maintained for between 12 and 72 hours.

16. The method of claim 1 wherein the wet packed roll is maintained for 24 hours prior to thermopolymerization.

17. The method of claim 16 wherein maintenance is at a temperature within the range of between 15° C. and 30° C.

18. The method of claim 17 wherein said temperature is room temperature.

19. The product of the process of claim 1.

20. A process of transparentizing a fibrous cellulosic material, which comprises:

applying a monomer having 3 ethylenically unsaturated radicals bonded to one common carbon atom to a cellulosic fibrous web in the presence of a thermopolymerization catalyst;

winding the web in a tight roll after application;

storing the roll below the polymerization temperature for the monomer until the mixed monomer and catalyst have impregnated the web; and then exposing the roll to an elevated temperature sufficient for polymerization of the monomer to take place under controlled conditions and dissipating excessive heat of polymerization into the environment of fibrous material to prevent spontaneous polymerization from overheating.

* * * * *